(No Model.) 2 Sheets—Sheet 1.
J. DAY.
CURTAIN RING.
No. 397,419. Patented Feb. 5, 1889.
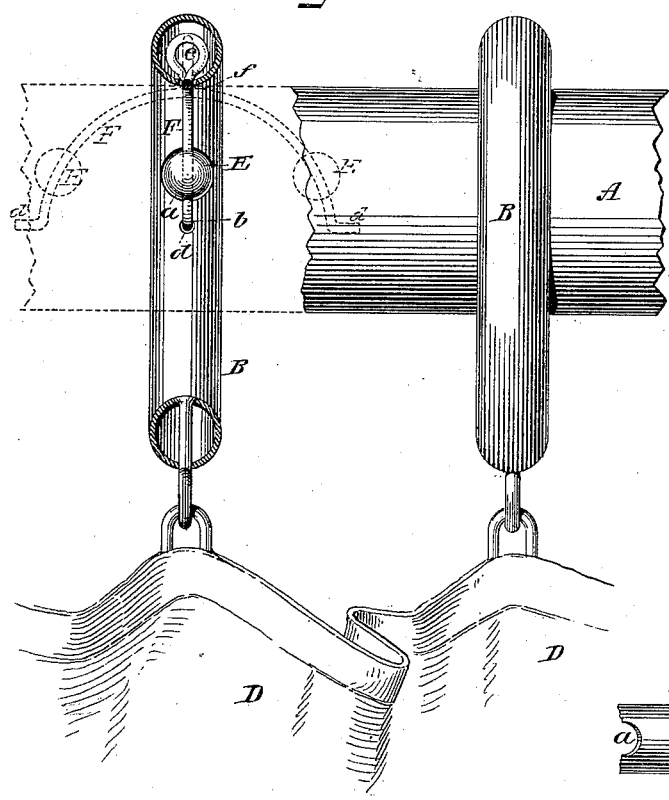
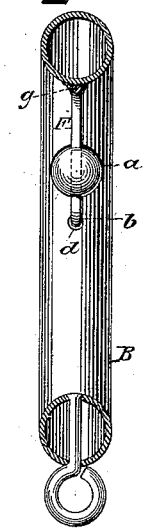
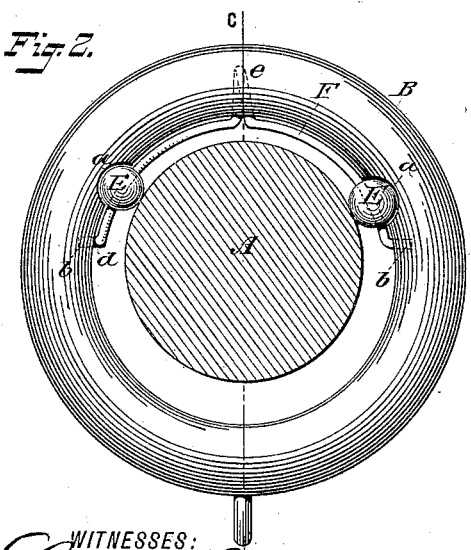
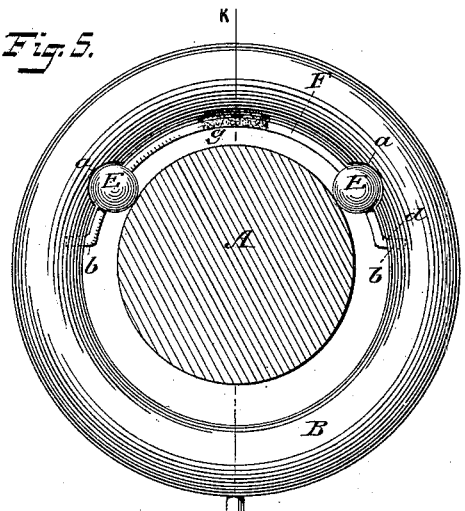
WITNESSES:
Gustave Dieterich
T. F. Bourne.
INVENTOR.
John Day
BY Briesen, Steele & ???
ATTORNEYS
N. PETERS, Photo-Lithographer, Washington, D. C.

(No Model.) 2 Sheets—Sheet 2.

J. DAY.
CURTAIN RING.

No. 397,419. Patented Feb. 5, 1889.

WITNESSES:
Gustave Dieterich
T. F. Bourne

INVENTOR
John Day
BY Briesen, Steele & Knauth
ATTORNEYS

UNITED STATES PATENT OFFICE.

JOHN DAY, OF NEW YORK, N. Y.

CURTAIN-RING.

SPECIFICATION forming part of Letters Patent No. 397,419, dated February 5, 1889.

Application filed October 17, 1888. Serial No. 288,326. (No model.)

*To all whom it may concern:*

Be it known that I, JOHN DAY, a resident of New York, N. Y., have invented an Improved Curtain-Ring, of which the following is a specification.

The object of my invention is to provide an improved curtain-ring that will slide easily on the curtain-pole when the curtains are drawn aside.

The invention consists in a curtain-ring having recesses on its inner side to receive rollers, combined with a curved wire and with balls or rollers aligned with said recesses, through which balls or rollers said wire passes, the ends of said wire being sprung into holes in the curtain-ring, the middle part of said wire being securely held to the curtain-ring.

The invention further consists in the details of improvement and the combinations of parts that will be more fully hereinafter set forth.

Reference is to be had to the accompanying drawings, forming part of this specification, in which—

Figure 6:
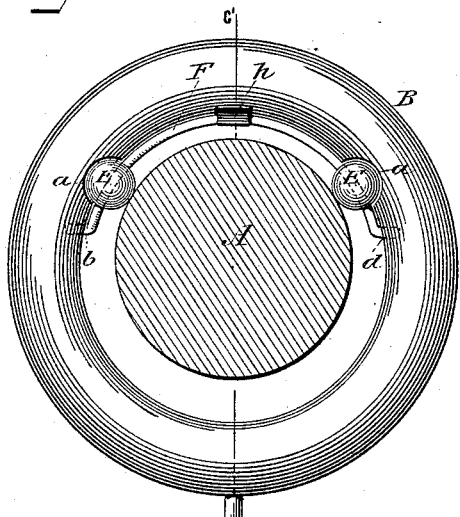
Figure 7:
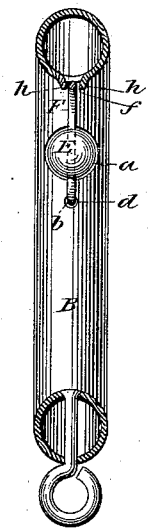
Figure 9:
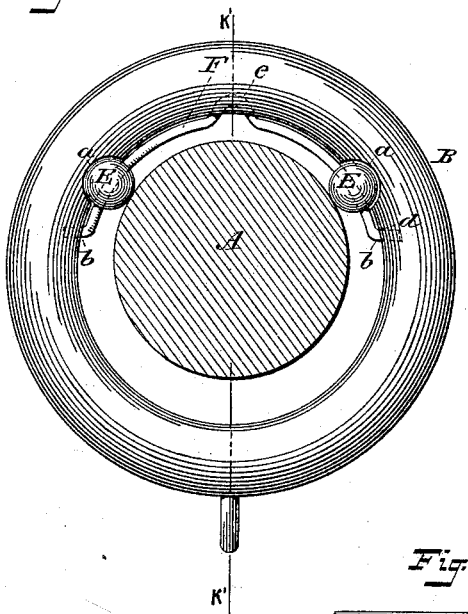
Figure 10:
Figure 8:
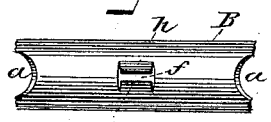

Figure 1 is a side view of a portion of a curtain-pole, showing my improved curtain-rings in position, one of said rings being in section on the line *c c*, Fig. 2. Fig. 2 is a side view of my improved curtain-ring in position on a pole. Fig. 3 is a detail inside view of a portion of said ring. Fig. 4 is a vertical section on the line *k k*, Fig. 5, of a modification; and Fig. 5 is a side view thereof. Fig. 6 is a side view of another modification. Fig. 7 is a vertical section on the line *c' c'*, Fig. 6, of said modification. Fig. 8 is a detail inside view of a portion of the ring shown in Fig. 6. Fig. 9 is a side view of still another modification; and Fig. 10 is a vertical section of the same on the line *k' k'*, Fig. 9.

In the accompanying drawings, the letter A represents a curtain-pole, and B is my improved curtain-ring, that is adapted to be placed upon said pole, to have movement along the pole and to support curtains in the ordinary manner. The ring B in the drawings is shown in the form of a hollow ring; but it may be otherwise suitably constructed.

*a* are recesses on the inner side of the ring B.

E are balls or rollers that are carried on the inner side of the curtain-ring B and are adapted to rest upon the curtain-pole A, as shown in the drawings. These balls or rollers are carried by the curtain-ring B in line with the recesses *a*, and are supported upon the ring B by a wire, F, that extends along the inner side or within the hollow of the hollow ring B and that passes through said rollers, as clearly shown in Figs. 1 and 2. The free ends of the wire F are bent outward at *b* and are sprung into holes *d* on the inner side of the ring B, as shown in Figs. 2 and 5, so that the wire F will be held to the ring at its ends.

In order to securely hold the middle portion of the wire F to the ring B, I form the middle part of said wire into an eye or loop, *e*, which is turned at a right angle to the length of the wire, as clearly shown in Fig. 1. This eye or loop *e* enters a slot, *f*, on the inner side of the ring B—that is, between the two recesses *a*. The slot *f* is of such dimensions as to permit the eye or loop *e* to pass through it when the wire F is held at right angles to its normal position, but when said wire is turned into its proper position prevents its being withdrawn.

In applying my improvements to a curtain-ring, the wire F, having the balls or rollers E attached, is passed partially through the ring, its free ends extending on either side of the ring B, as shown in dotted lines in Fig. 1. The eye *e* is then passed through the slot *f* in the ring B, and the wire F turned into the position shown in full lines in Figs. 1 and 2, whereby the eye *e* will be turned so as to be brought at right angles to the slot *f*, and thus be prevented from being drawn out of the slot *f*. The balls or rollers E are then brought in line with the recesses *a*, and the ends *b* of the wire F are sprung into the holes *d* in the curtain-ring. By this means the balls or rollers E are securely attached to the curtain-ring in a very simple manner. The spring tendency of the wire F will hold the ends *b* in the holes *d*, and also hold the balls or rollers E in their proper position in the recesses *a*.

When my improved curtain-ring is placed upon a pole and the ring moved along the pole by the movement of the curtain it supports or otherwise, the ring will ride freely along the pole by running on the balls or rollers E.

By this means the jamming of the curtain-rings upon the pole when said rings are moved along the pole is overcome.

In the modification shown in Fig. 5 the middle portion of the wire F is secured to a curtain-ring by means of solder, g, its ends b being sprung into the holes d in the curtain-ring, as before shown.

In the modifications shown in Figs. 6, 7, and 8 the ends b of the wire F are sprung into holes d, as before shown, while the middle portion of the wire is held from lateral movement by means of two projecting lips, h, formed on the ring, said lips leaving between them a slot, f, between which lips and through which slot said wire passes, as clearly shown in Fig. 7. These lips are formed by cutting slits on the inner side of the ring B, between the recesses a, for the rollers E, and then bending the metal left by said slits, as in Fig. 7.

In the modification shown in Figs. 9 and 10 the middle portion of the wire F is bent somewhat in a V shape, e, instead of in a loop, as in Fig. 1. This V-shape bend e of the wire F is passed into a slot, f, on the inner side of the curtain-ring B, whereby lateral movement of the wire F is prevented. The ends b of the wire F are sprung into holes d, as before shown. In all the above modifications the balls or rollers E are carried by the wire F and in line with the recesses a, as described in reference to Figs. 1 and 2.

Having now described my invention, what I claim is—

1. The curtain-ring B, having recesses a and holes d, combined with the curved wire F and with the rollers E, through which said wire passes, said rollers being aligned with the recesses a, the free ends of the wire F being sprung into the holes d in the ring B, the middle portion of the wire F being rigidly held to the ring B, substantially as described.

2. The ring B, having recesses a, holes d, and slot f on its inner side, combined with the curved wire F, said wire having the eye or bend e, that enters the slot f, the free ends of the wire F being sprung into the holes d, and with the rollers E, through which the wire F passes, said rollers being aligned with the recesses a and held upon the ring B by the wire F, substantially as described.

JOHN DAY.

Witnesses:
J. W. PRENTICE,
JOHN A. CONDON.